United States Patent
Vargas et al.

(10) Patent No.: US 9,428,410 B2
(45) Date of Patent: Aug. 30, 2016

(54) METHODS FOR TREATING A FERROUS METAL SUBSTRATE

(71) Applicant: PPG Industries Ohio, Inc., Cleveland, OH (US)

(72) Inventors: Richard M. Vargas, Mayfield Village, OH (US); John F. McIntyre, Bay Village, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 390 days.

(21) Appl. No.: 13/786,914

(22) Filed: Mar. 6, 2013

(65) Prior Publication Data

US 2013/0213896 A1 Aug. 22, 2013

(51) Int. Cl.
| | |
|---|---|
| *C02F 1/64* | (2006.01) |
| *C23C 22/82* | (2006.01) |
| *C23C 22/86* | (2006.01) |
| *C02F 1/76* | (2006.01) |
| *C23C 22/08* | (2006.01) |
| *C23C 22/36* | (2006.01) |
| *C02F 1/00* | (2006.01) |

(52) U.S. Cl.
CPC ............... *C02F 1/64* (2013.01); *C02F 1/766* (2013.01); *C23C 22/08* (2013.01); *C23C 22/361* (2013.01); *C23C 22/86* (2013.01)

(58) Field of Classification Search
CPC .......... C02F 1/64; C02F 1/766; C23C 22/08; C23C 22/361; C23C 22/82–22/86
USPC .......................................... 148/247; 210/722
See application file for complete search history.

(56) References Cited

U.S. PATENT DOCUMENTS

| | | | |
|---|---|---|---|
| 3,455,806 | A | 7/1969 | Spoor |
| 3,663,389 | A | 5/1972 | Koral et al. |
| 3,749,657 | A | 7/1973 | Le Bras et al. |
| 3,793,278 | A | 2/1974 | De Bona |
| 3,912,548 | A | 10/1975 | Faigen |
| 3,928,157 | A | 12/1975 | Suematsu et al. |
| 3,947,338 | A | 3/1976 | Jerabek et al. |
| 3,947,339 | A | 3/1976 | Jerabek et al. |
| 3,962,165 | A | 6/1976 | Bosso et al. |
| 3,975,346 | A | 8/1976 | Bosso et al. |
| 3,984,299 | A | 10/1976 | Jerabek |
| 3,984,922 | A | 10/1976 | Rosen |

(Continued)

FOREIGN PATENT DOCUMENTS

| | | |
|---|---|---|
| CA | 2087352 A1 | 1/1994 |
| EP | 0 221 760 A2 | 5/1987 |

(Continued)

OTHER PUBLICATIONS

Espacenet English abstract of JP 2006-219691 A.

(Continued)

*Primary Examiner* — Lois Zheng
(74) *Attorney, Agent, or Firm* — Alicia M. Passerin, Esq.

(57) ABSTRACT

Disclosed are methods for treating and coating a ferrous metal substrate, such as cold rolled steel, hot rolled steel, and electrogalvanized steel. These methods include contacting the ferrous metal substrate with an aqueous pretreatment composition comprising: (a) a Group IIIB and/or IVB metal compound; (b) phosphate ions; and (c) water. Also disclosed are off-shift methods of removing iron from the pretreatment bath.

20 Claims, 3 Drawing Sheets

(56) References Cited

U.S. PATENT DOCUMENTS

| | | |
|---|---|---|
| 4,001,101 A | 1/1977 | Bosso et al. |
| 4,017,334 A | 4/1977 | Matsushima et al. |
| 4,116,900 A | 9/1978 | Belanger |
| 4,134,866 A | 1/1979 | Tominaga et al. |
| 4,134,932 A | 1/1979 | Kempter et al. |
| 4,148,670 A | 4/1979 | Kelly |
| 4,470,853 A | 9/1984 | Das et al. |
| 4,992,115 A | 2/1991 | Ikeda |
| 4,992,116 A | 2/1991 | Hallman |
| 5,073,196 A | 12/1991 | Fotinos et al. |
| 5,104,577 A | 4/1992 | Ikeda et al. |
| 5,139,586 A | 8/1992 | Das |
| 5,328,525 A | 7/1994 | Musingo et al. |
| 5,380,374 A | 1/1995 | Tomlinson |
| 5,441,580 A | 8/1995 | Tomlinson |
| 5,449,415 A | 9/1995 | Dolan |
| 5,460,694 A | 10/1995 | Schapira et al. |
| 5,653,823 A | 8/1997 | McMillen et al. |
| 5,662,746 A | 9/1997 | Affinito |
| 5,728,233 A | 3/1998 | Ikeda et al. |
| 5,868,872 A | 2/1999 | Karmaschek et al. |
| 6,193,815 B1 | 2/2001 | Wada et al. |
| 6,805,756 B2 | 10/2004 | Claffey et al. |
| 6,875,800 B2 | 4/2005 | Vanier et al. |
| 6,894,086 B2 | 5/2005 | Munro et al. |
| 7,605,194 B2 | 10/2009 | Ferencz et al. |
| 8,153,344 B2 | 4/2012 | Faler et al. |
| 2003/0221751 A1 | 12/2003 | Claffey et al. |
| 2004/0129346 A1 | 7/2004 | Kolberg et al. |
| 2005/0287348 A1 | 12/2005 | Faler et al. |
| 2007/0068602 A1 | 3/2007 | Pemberton et al. |
| 2009/0084471 A1 | 4/2009 | Brent et al. |
| 2009/0145856 A1 | 6/2009 | Raymond et al. |
| 2011/0083580 A1 | 4/2011 | Cheng et al. |
| 2011/0180470 A1 | 7/2011 | Harris |
| 2012/0145646 A1 | 6/2012 | Bae et al. |

FOREIGN PATENT DOCUMENTS

| | | |
|---|---|---|
| EP | 1571237 A1 | 9/2005 |
| GB | 2259920 A | 3/1993 |
| JP | 2004-27280 A | 1/2004 |
| JP | 2006-219691 A | 8/2006 |
| JP | 2006219691 A | 8/2006 |
| WO | 9533869 | 12/1995 |
| WO | 2005001158 A1 | 1/2005 |

OTHER PUBLICATIONS

Faler, U.S. Appl. No. 60/482,167 entitled "Aqueous Dispersions of Microparticles Having a Nanoparticulate Phase and Coating Compositions Containing the Same", filed Jun. 24, 2003.
"Kolphos ZP, A Revolution in Pre-Treatment", Issue 2, Jun. 2004.
"Safety Data Sheet, HOUGHTO-PHOS ZP", Houghton, Issued Feb. 25, 2005.

METHODS FOR TREATING A FERROUS METAL SUBSTRATE

FIELD OF THE INVENTION

The present invention relates to methods for treating a ferrous metal substrate, such as cold rolled steel, hot rolled steel, and electrogalvanized steel. The present invention also relates to coated ferrous metal substrates. The present invention also relates to methods for removing iron from a pretreatment bath when the pretreatment bath is on the processing line, both in the presence of an article to be coated by the pretreatment composition and when the pretreatment bath is off-shift.

BACKGROUND INFORMATION

The use of protective coatings on metal substrates for improved corrosion resistance and paint adhesion is common. Conventional techniques for coating such substrates include techniques that involve pretreating the metal substrate with a phosphate conversion coating and chrome-containing rinses. Typical phosphate conversion coatings operate in the range of about at least 1,000 parts per million ("ppm") of phosphate, which leads to waste treatment issues. The use of such phosphate and/or chromate-containing compositions, therefore, imparts environmental and health concerns.

As a result, chromate-free and/or phosphate-free pretreatment compositions have been developed. Such compositions are generally based on chemical mixtures that in some way react with the substrate surface and bind to it to form a protective layer. For example, pretreatment compositions based on a group IIIB or IVB metal compound have recently become more prevalent.

When processing ferrous metal substrates through a pretreatment composition based on a group IIIB or IVB metal compound, however, the concentration of ferric ($Fe^{+3}$) iron in a bath of the pretreatment composition increases over time as more iron based metal is treated. In particular, soluble ($Fe^{+2}$) iron from the substrate becomes insoluble ($Fe^{+3}$) through $Fe^{+2}$ concentration build up, oxidation, and subsequent reaction with oxygen and water. The resulting insoluble rust, i.e., hydrated iron (III) oxide ($Fe_2O_3 \cdot nH_2O$) and/or iron (III) oxide-hydroxide (FeO(OH)), flocculates and the insoluble rust particles resist settling out during the mild agitation present while processing parts. As a result, the insoluble rust particles can adhere to or deposit on the substrate and be carried to subsequent processing steps (particularly when filtration equipment is not available), such as a downstream electrocoat bath that is employed to deposit an organic coating. Such cross-contamination can detrimentally affect the performance of such subsequently electrodeposited coatings.

As a result, it is conventional practice in the industry to periodically dilute the pretreatment bath to reduce soluble iron concentration as a preventative measure and to add a replenisher to the pretreatment bath in order to replenish the bath ingredients and to regain coating ability. In some instances, the pretreatment bath has to be removed from the processing line to perform methods for removing rust therefrom. Alternatively, the pretreatment bath must be discharged every one to two weeks and a fresh bath made up. Each of these practices is costly due the significant product loss, waste treatment, and inconvenience.

As a result, it would be desirable to provide improved methods for treating a ferrous metal substrate and for removing soluble iron that address at least some of the foregoing.

SUMMARY OF THE INVENTION

In certain respects, the present invention is directed to methods for coating a ferrous metal substrate.

In certain respects, the method for coating a ferrous metal substrate comprises: (a) contacting the ferrous metal substrate with an aqueous pretreatment composition having a pH of 4 to 5.5 and comprising: (a) a Group IIIB and/or IVB metal compound; (b) phosphate ions; and (c) water, wherein the Group IIIB and/or IVB metal compound is present in the pretreatment composition in an amount of 10 to 500 ppm metal and the weight ratio of Group IIIB and/or IVB metal to phosphate ions in the pretreatment composition is at least 0.8:1; and wherein the phosphate ions are maintained in a bath of the pretreatment composition in an amount: (i) sufficient to essentially prevent the formation of insoluble rust in the bath; and (ii) insufficient to prevent the deposition of a Group IIIB or IVB metal film having a coverage of at least 10 mg/m² on the ferrous metal substrate; and (iii) resulting in a weight ratio of phosphate to ferric ions of 1 to 1.8:1; and then (b) contacting the substrate with a coating composition comprising a film-forming resin to form a coated metal substrate that exhibits corrosion resistance properties.

In certain other respects, the method for coating a ferrous metal substrate comprises: (a) contacting the ferrous metal substrate with an aqueous pretreatment composition having a pH of 4 to 5.5 and comprising: (a) a Group IIIB and/or IVB metal compound; (b) phosphate ions; and (c) water, wherein the Group IIIB and/or IVB metal compound is present in the pretreatment composition in an amount of 10 to 500 ppm metal and the weight ratio of Group IIIB and/or IVB metal to phosphate ions in the pretreatment composition is at least 0.8:1; and wherein the phosphate ions are maintained in a bath of the pretreatment composition in an amount: (i) sufficient to essentially prevent the formation of insoluble rust in the bath; and (ii) insufficient to prevent the deposition of a Group IIIB or IVB metal film having a coverage of at least 10 mg/m² on the ferrous metal substrate; and (iii) resulting in a weight ratio of phosphate to additional soluble iron in the ferrous state in a range of 1.8 to 10:1; and then (b) contacting the substrate with a coating composition comprising a film-forming resin to form a coated metal substrate that exhibits corrosion resistance properties.

In certain other respects, the present invention is directed to methods for removing iron from a pretreatment bath comprising steps that are performed when the pretreatment bath is off-shift.

In certain respects, the off-shift methods for removing iron from a pretreatment bath containing a pretreatment composition comprising a Group IIIB and/or Group IV metal, comprise: (a) reducing the pH of the pretreatment bath by at least 0.2; (b) adding phosphate ions to the pretreatment bath and in (a); and (c) raising the pH of the pretreatment bath in (b) by at least 0.2.

In certain other respects, the off-shift methods for removing iron from a pretreatment bath containing a pretreatment composition comprising a Group IIIB and/or Group IVB metal, comprise: (a) adding an acid to the pretreatment bath to reduce the pH of the pretreatment composition to below 4.0; (b) adding phosphate ions to the pretreatment bath in (a); and (c) raising the pH of the pretreatment bath in (b) to 4.0 and 5.5.

The present invention is also directed to substrates treated and coated thereby.

DETAILED DESCRIPTION OF THE INVENTION

Figure 1:
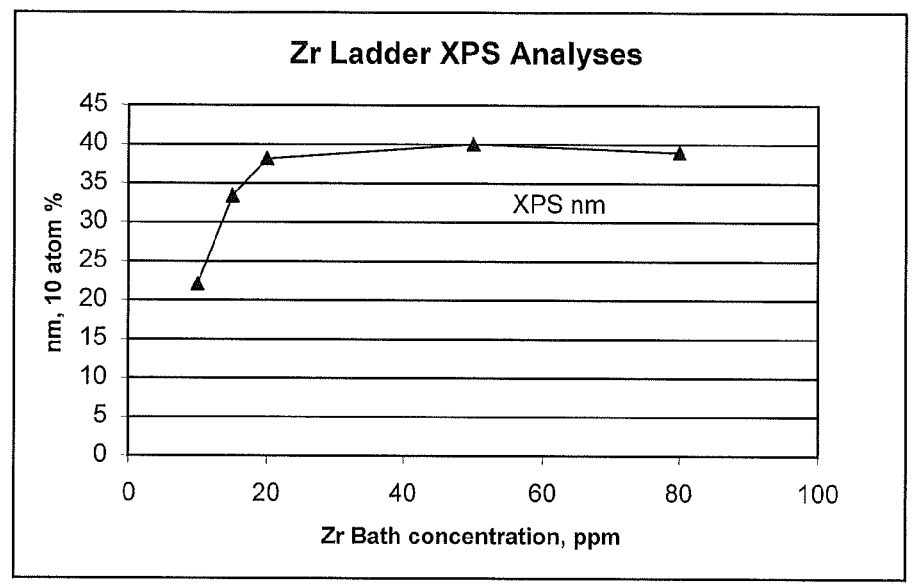
FIGS. 1 and 2 are graphical representations of observed results of Example 3.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In this application, the term "off-shift" means that an article to be coated by the pretreatment composition is absent from the pretreatment bath, but does not mean that the pretreatment bath is necessarily removed from the process line.

In this application, the term "total iron" or "total Fe" means the total amount of iron in a pretreatment bath, including but not limited to ferric ($Fe^{+2}$) iron and ferrous ($Fe^{+3}$) iron.

In this application, unless specifically indicated to the contrary, when it is stated that a pretreatment composition is "substantially free" of a particular component, it means that the material being discussed is present in the composition, if at all, as an incidental impurity. In other words, the material is not intentionally added to the composition, but may be present at minor or inconsequential levels, because it was carried over as an impurity as part of an intended composition component. Moreover, when it is stated that a pretreatment composition is "completely free" of a particular component it means that the material being discussed is not present in the composition at all.

As previously mentioned, certain embodiments of the present invention are directed to methods for treating a ferrous metal substrate. Suitable ferrous metal substrates for use in the present invention include those that are often used in the assembly of automotive bodies, automotive parts, and other articles, such as small metal parts, including fasteners, i.e., nuts, bolts, screws, pins, nails, clips, buttons, and the like. Specific examples of suitable ferrous metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Moreover, the ferrous metal substrate being treating by the methods of the present invention may be a cut edge of a substrate that is otherwise treated and/or coated over the rest of its surface. The metal ferrous substrate coated in accordance with the methods of the present invention may be in the form of, for example, a sheet of metal or a fabricated part.

The ferrous metal substrate to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen™ 163, 177, 611L, and 490MX, each of which are commercially available from PPG Industries, Inc. Such cleaners are often followed and/or preceded by a water rinse.

As previously indicated, certain embodiments of the present invention are directed to methods for treating a metal substrate that comprise contacting the metal substrate with a pretreatment composition comprising a group IIIB and/or IVB metal. As used herein, the term "pretreatment composition" refers to a composition that upon contact with the substrate reacts with and chemically alters the substrate surface and binds to it to form a protective layer.

Often, the pretreatment composition comprises a carrier, often an aqueous medium, so that the composition may be in the form of a solution or dispersion of a group IIIB and/or IVB metal compound in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 50 to 150° F. (10 to 65° C.). The contact time is often from 2 seconds to five minutes, such as 30 seconds to 2 minutes.

As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal itself may be used. In certain embodiments, a group IIIB and/or IVB metal compound is used. As used herein, the term "group IIIB and/or IVB metal compound" refers to compounds that include at least one element that is in group IIIB or group IVB of the CAS Periodic Table of the Elements.

In certain embodiments, the group IIIB and/or IVB metal compound used in the pretreatment composition may be a compound of zirconium, titanium, hafnium, or a mixture thereof. Suitable compounds of zirconium include, but are not limited to, hexafluorozirconic acid, alkali metal and ammonium salts thereof, ammonium zirconium carbonate, zirconium basic carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate.

In certain embodiments, the group IIIB and/or IVB metal compound is present in a bath of the pretreatment composition in an amount of at least 10 ppm metal, such as at least 20 ppm metal, at least 30 ppm metal, or, in some cases, at least 50 ppm metal (measured as elemental metal). In certain embodiments, the group IIIB and/or IVB metal compound is present in the bath of the pretreatment composition in an amount of no more than 500 ppm metal, such as no more than 150 ppm metal, or, in some cases, no more than 80 ppm metal (measured as elemental metal). The amount of group IIIB and/or IVB metal in the pretreatment composition can range between any combination of the recited values inclusive of the recited values.

As previously indicated, the pretreatment compositions used in certain embodiments of the methods of the present invention comprise phosphate ions. In certain embodiments, the source of phosphate ions is phosphoric acid, such as 75% phosphoric acid, although other sources of phosphate ions are contemplated by the present invention, such as, for example, monosodium phosphate or disodium phosphate. In certain other embodiments, the pretreatment compositions of the methods of the present invention are substantially free of phosphate ions.

As indicated previously, in certain embodiments of the methods of the present invention, the phosphate ions are maintained in a bath of the pretreatment composition in an amount sufficient to essentially prevent the formation of insoluble rust in the bath. As used herein, the term "maintained" means that the amount of phosphate ions is regulated and, as necessary, adjusted to essentially prevent the formation of insoluble rust. As used herein, the phrase "essentially prevent the formation of insoluble rust" means that insoluble rust, i.e., including but not limited to, hydrated iron (III) oxide ($Fe_2O_3 \cdot nH_2O$) and/or iron (III) oxide-hydroxide (FeO(OH)), is prevented from forming in the bath to an extent that an orange or red-brown appearance indicative of the formation of such compounds in the bath is not visible to the naked eye. Rather, in certain embodiments of the present invention, the phosphate ions are maintained in the bath in an amount sufficient to complex with the soluble iron etched from the surface of the ferrous metal substrate being treated to form iron (III) phosphate ($FePO_4$) in the bath, which results in the bath having a whitish appearance, rather than an orange or red-brown appearance associated with the presence of rust and which results in the formation of an insoluble sludge that can be removed from the bath using conventional filtration equipment. Certain embodiments of the present invention, therefore, limit the amount of ferric iron ($Fe^{+3}$) in the bath (from the ferrous metal substrate) that is available to become insoluble rust that can deposit on the substrate and be carried to subsequent processing equipment, such as a downstream spray nozzles, pumps, rinse baths, and electrocoat baths for the deposition of an organic coating. As previously indicated, such cross-contamination can detrimentally affect the performance of such subsequently deposited coatings.

In certain embodiments of the methods of the present invention, the phosphate ions are also maintained in the bath of the pretreatment composition in an amount insufficient to prevent the deposition of a Group IIIB or IVB metal film having a coverage (total film weight) of at least 10 mg/m$^2$, such as at least 100 mg/m$^2$ or, in some cases, 100 to 500 mg/m$^2$, on the ferrous metal substrate. It has been discovered that there is, particularly at the bath pH's used in the present invention, a delicate balance between the phosphate ions complexing with the soluble iron etched from the ferrous metal substrate to form iron phosphate, as is desired, and complexing with the Group IIIB or IVB metal present in the bath, which is not desired because it would prevent the deposition of a sufficient Group IIIB or IVB metal film on the ferrous metal substrate.

It has been discovered that the presence of 1 to 1.8, such as 1.2 to 1.6 parts by weight phosphate ions to every 1 part by weight ferric ($Fe^{+3}$) ions in a composition is sufficient to essentially prevent the formation of insoluble rust as described above while being insufficient to prevent the deposition of a Group IIIB or IVB metal film having a coverage of at least 100 mg/m$^2$, such as at least 10 mg/m$^2$, on a ferrous metal substrate. As a result, in certain embodiments of the methods of the present invention, the phosphate ions are maintained in the bath at a level that results in a weight ratio of phosphate ions to ferric ions of 1 to 1.8:1, in some cases 1.2 to 1.6:1. If the weight ratio of phosphate ions to ferric ions is less than 1:1, then there may be too little phosphate in the bath to essentially prevent the formation of insoluble rust in the bath as described above. If the weight ratio of phosphate ions to ferric ions is greater than 1.8:1, then the amount of phosphate ions may be sufficient to prevent the deposition of an adequate Group IIIB or IVB metal film on a ferrous metal substrate. The ratio of phosphate ions to ferric ions in the pretreatment composition can range between any combination of the recited values inclusive of the recited values.

In addition, in certain embodiments of the methods of the present invention, the phosphate ions are maintained in the bath at a level that results in a weight ratio of group IIIB and/or IVB metal to phosphate ions in the bath of at least 50:1, in some cases at least 25:1, in some cases at least 12.5:1, in some cases at least 3:1, and in some cases at least 2:1. If the weight ratio of group IIIB and/or IVB metal to phosphate ions is less than 2:1, then there may be too much phosphate in the bath, thereby negatively impacting on the ability to deposit a sufficient Group IIIB or IVB metal film on the ferrous metal substrate.

As is apparent, because the pretreatment compositions of the present invention comprise, in some cases, 20 to 500 ppm group IIIB and/or IVB metal, such as 30 to 150 ppm, or, in some cases, 30 to 80 ppm group IIIB and/or IVB metal, in certain embodiments of the methods of the present invention, relatively little phosphate ion is often present in the bath since the phosphate ions are, in certain embodiments, maintained in the bath at a level that results in a weight ratio of group IIIB and/or IVB metal to phosphate ions in the bath of at least 2:1, in some cases at least 3:1. As a result, in certain embodiments, such a bath comprises no more than 30 ppm, such as 10 to 30 ppm, phosphate ions. Yet, the presence of a small level of phosphate ions has been shown to have a dramatic effect on useful bath life by preventing the formation of insoluble rust in the pretreatment bath for up to months or years in certain embodiments, such as by removing iron from the pretreatment bath.

As discussed above, when processing ferrous metal substrates through a pretreatment composition based on a group IIIB or IVB metal compound, the concentration of ferric ($Fe^{+3}$) iron in a bath of the pretreatment composition increases over time as more iron based metal is treated. The result is that such a bath accumulates insoluble rust that can deposit on the substrate being treated and be carried to subsequent processing steps. To avoid this, such a bath must often be replaced periodically, in some cases once per week. It has been surprisingly discovered, however, that the presence of the aforementioned small levels of phosphate can prevent the formation of insoluble rust, without preventing the formation of an adequate group IIIB and/or IVB metal film, such that the bath can be operated for several months, maybe indefinitely, without replacement. That such a small level of phosphate could extend bath life to such a significant degree was surprising and not anticipated. Moreover, the presence of phosphate ions in such small amount results in the formation of a minimal amount of sludge that is more than offset by the prevention of insoluble rust, such that waste disposal issues are not a significant concern.

In certain embodiments, the pretreatment composition also comprises an electropositive metal. As used herein, the term "electropositive metal" refers to metals that are more electropositive than the metal substrate. This means that, for purposes of the present invention, the term "electropositive metal" encompasses metals that are less easily oxidized than the metal of the metal substrate that is being treated. As will be appreciated by those skilled in the art, the tendency of a metal to be oxidized is called the oxidation potential, is expressed in volts, and is measured relative to a standard hydrogen electrode, which is arbitrarily assigned an oxidation potential of zero. The oxidation potential for several elements is set forth in the table below. An element is less easily oxidized than another element if it has a voltage value, E*, in the following table, that is greater than the element to which it is being compared.

| Element | Half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.44 |
| Nickel | $Ni^{2+} + 2e \rightarrow Ni$ | −0.25 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.79 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises a ferrous metal, as is the case in the present invention, suitable electropositive metals for inclusion in the pretreatment composition include, for example, nickel, tin, copper, silver, and gold, as well mixtures thereof.

In certain embodiments, the source of electropositive metal in the pretreatment composition is a water soluble metal salt. In certain embodiments of the present invention, the water soluble metal salt is a water soluble copper compound. Specific examples of water soluble copper compounds, which are suitable for use in the present invention include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be preferable to add a complexing agent that suppresses the precipitation of copper ions, thus stabilizing them as a copper complex in the solution.

In certain embodiments, the copper compound is added as a copper complex salt such as $K_3Cu(CN)_4$ or Cu-EDTA, which can be present stably in the composition on its own, but it is also possible to form a copper complex that can be present stably in the composition by combining a complexing agent with a compound that is difficulty soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include polyphosphates, such as sodium tripolyphosphate and hexametaphosphoric acid; aminocarboxylic acids, such as ethylenediaminetetraacetic acid, hydroxyethylethylenediaminetriacetic acid, and nitrilotriacetic acid; hydroxycarboxylic acids, such as tartaric acid, citric acid, gluconic acid, and salts thereof; aminoalcohols, such as triethanolamine; sulfur compounds, such as thioglycolic acid and thiourea, and phosphonic acids, such as nitrilotrimethylenephosphonic acid, ethylenediaminetetra(methylenephosphonic acid) and hydroxyethylidenediphosphonic acid.

In certain embodiments, the electropositive metal, such as copper, is included in the pretreatment compositions in an amount of at least 1 ppm, such as at least 5 ppm, or in some cases, at least 10 ppm of total metal (measured as elemental metal). In certain embodiments, the electropositive metal is included in such pretreatment compositions in an amount of no more than 500 ppm, such as no more than 100 ppm, or in some cases, no more than 50 ppm of total metal (measured as elemental metal). The amount of electropositive metal in the pretreatment composition can range between any combination of the recited values inclusive of the recited values.

As indicated, the operating pH of the pretreatment composition used in the methods of the present invention ranges from 4.0 to 5.5, in some cases, 4.0 to 5.0, 4.5 to 5.5, or, in yet other cases, 4.5 to 5.0. The pH of the pretreatment composition may be adjusted using, for example, any acid or base as is necessary.

In addition to the previously described components, the pretreatment compositions used in the methods of the present invention may comprise any of a variety of additional optional components. For example, in certain embodiments, the pretreatment compositions used in the methods of the present invention comprises a polyhydroxy functional cyclic compound as is described in U.S. Pat. No. 6,805,756 at col. 3, line 9 to col. 4, line 32, the cited portion of which being incorporated herein by reference. In other embodiments, however, the pretreatment compositions used in the methods of the present invention are substantially free, or, in some cases, completely free, of any such polyhydroxy functional cyclic compound.

In certain embodiments, the pretreatment compositions used in the methods of the present invention comprise an oxidizer-accelerator, such as those described in U.S. Pat. No. 6,805,756 at col. 4, line 52 to col. 5, line 13, the cited portion of which being incorporated herein by reference, and U.S. Pat. No. 6,193,815 at col. 4, line 62 to col. 5, line 39, the cited portion of which being incorporated herein by reference. By contrast, in other embodiments, the pretreatment compositions are substantially free, or, in some cases, completely free, of any such an oxidizer-accelerator.

In certain embodiments, the pretreatment composition comprises an organic film forming resin, such as the reaction product of an alkanolamine and an epoxy-functional material containing at least two epoxy groups, such as those disclosed in U.S. Pat. No. 5,653,823; a resin containing beta hydroxy ester, imide, or sulfide functionality, incorporated by using dimethylolpropionic acid, phthalimide, or mercaptoglycerine as an additional reactant in the preparation of the resin; the reaction product is that of the diglycidyl ether of Bisphenol A (commercially available from Shell Chemical Company as EPON 880), dimethylol propionic acid, and diethanolamine in a 0.6 to 5.0:0.05 to 5.5:1 mole ratio; water soluble and water dispersible polyacrylic acids as disclosed in U.S. Pat. Nos. 3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449, 415. By contrast, in other embodiments, the pretreatment compositions are substantially free, or, in some cases, completely free, of any organic film-forming resin, such as one or more of those described above.

In certain embodiments, the pretreatment compositions used in the methods of the present invention comprise fluoride ion, such as is described in U.S. Pat. No. 6,805,756 at col. 6, lines 7-23, the cited portion of which being incorporated herein by reference. In certain embodiments, the fluoride ion is introduced into the composition through the Group IIIB and/or IVB metal compound. In certain embodiments, the pretreatment compositions are substantially free, or, in some cases, completely free, of any fluoride ion introduced to the pretreatment composition from a source other than through the Group IIIB and/or IVB metal compound.

In certain embodiments, the pretreatment compositions used in the methods of the present invention comprise a polysaccharide, such as is described in U.S. Pat. No. 6,805, 756 at col. 6, lines 53-64, the cited portion of which being incorporated herein by reference and International Application WO 2005/001158 at page 3, lines 17-23. By contrast, in other embodiments, the pretreatment compositions are substantially free, or, in some cases, completely free, of any such polysaccharide.

In certain embodiments, the pretreatment compositions used in the methods of the present invention comprise a phosphate acid ester, a water-soluble polyethylene glycol ester of a fatty acid, and/or nitric acid, such as is described in U.S. Pat. No. 5,139,586 at col. 6, lines 31-63, the cited portion of which being incorporated herein by reference. By contrast, in other embodiments, the pretreatment compositions are substantially free, or, in some cases, completely free, of a phosphate acid ester, a water-soluble polyethylene glycol ester of a fatty acid, and/or nitric acid.

In certain embodiments, the pretreatment compositions used in the methods of the present invention comprise vanadium and/or cerium ions, such as is described in U.S. Pat. No. 4,992,115 at col. 2, line 47 to col. 3, line 29, the cited portion of which being incorporated herein by reference and U.S. Patent Application Publication No. 2007/0068602. By contrast, in other embodiments, the pretreatment compositions are substantially free, or, in some cases, completely free, of vanadium and/or cerium ions.

In certain embodiments, the pretreatment compositions used in the methods of the present invention comprise a phosphorous acid, hypophosphorous acid and/or salts thereof, such as is described in U.S. Pat. No. 5,728,233 at col. 4, lines 24-37, the cited portion of which being incorporated herein by reference. By contrast, in other embodiments, the pretreatment compositions are substantially free, or, in some cases, completely free, of phosphorous acid, hypophosphorous acid and/or salts thereof.

In certain embodiments, the pretreatment compositions used in the methods of the present invention comprise a Group IIA metal, such as is described in U.S. Pat. No. 5,380,374 at col. 3, lines 25-33, the cited portion of which being incorporated herein by reference, and/or a Group IA metal, such as is described in U.S. Pat. No. 5,441,580 at col. 2, line 66 to col. 3, line 4, the cited portion of which being incorporated herein by reference. By contrast, in other embodiments, the pretreatment compositions are substantially free, or, in some cases, completely free, of any Group IIA metal and/or any Group IA metal.

In certain embodiments, the pretreatment compositions used in the methods of the present invention comprise a molybdenum compound, such as is described in UK Patent Application GB 2 259 920 A. By contrast, in other embodiments, the pretreatment compositions are substantially free, or, in some cases, completely free, of any molybdenum compound.

In certain embodiments, the pretreatment compositions used in the methods of the present invention comprise one or more ions of metals selected from the group consisting of scandium, yttrium, lanthanum, praseodymium, neodymium, samarium, europium, gadolinium, terbium, dysprosium, holmium, erbium, thulium, ytterbium, and lutetium, such as is described in U.S. Pat. No. 5,104,577 at col. 2, line 60 to col. 3, line 26, the cited portion of which being incorporated herein by reference. By contrast, in other embodiments, the pretreatment compositions are substantially free, or, in some cases, completely free, of any ions of metals selected from the group consisting of scandium, yttrium, lanthanum, praseodymium, neodymium, samarium, europium, gadolinium, terbium, dysprosium, holmium, erbium, thulium, ytterbium, and lutetium.

The pretreatment composition may optionally contain other materials, such as nonionic surfactants and auxiliaries conventionally used in the art of pretreatment. In an aqueous medium, water dispersible organic solvents, for example, alcohols with up to about 8 carbon atoms, such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents.

In certain embodiments, the pretreatment composition also comprises a filler, such as a siliceous filler. Non-limiting examples of suitable fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Examples of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate. By contrast, in other embodiments, the pretreatment compositions are substantially free, or, in some cases, completely free, of any such filler.

In certain embodiments, the pretreatment composition is substantially or, in some cases, completely free of chromate and/or heavy metal phosphate, such as zinc phosphate. As used herein, the term "substantially free" when used in reference to the absence of chromate and/or heavy metal phosphate in the pretreatment composition, means that these substances are not present in the composition to such an extent that they cause a burden on the environment. As used herein, the term "completely free", when used with reference to the absence of a heavy metal phosphate and/or chromate, means that there is no heavy metal phosphate and/or chromate in the composition at all.

As will be appreciated, in certain embodiments, the pretreatment composition utilized in the methods of the present invention consists essentially of or, in some cases, consists of: (a) a Group IIIB and/or IVB metal compound, such as a zirconium compound; (b) a source of phosphate ions, such as phosphoric acid; and (c) water. In certain other embodiments, the pretreatment composition utilized in the methods of the present invention consists essentially of or, in some cases, consists of: (a) a Group IIIB and/or IVB metal compound, such as a zirconium compound; and (c) water. In certain embodiments, such pretreatment compositions include fluoride ions introduced to the pretreatment composition through the Group IIIB and/or IVB metal compound. As used herein, the phrase "consists essentially of" means that the composition does not include any other components that would materially affect the basic and novel characteristic(s) of the invention. For the purposes of the present invention, this means that the pretreatment composition does not include any components that would materially affect the pretreatment composition's ability to be successfully employed in the methods of the present invention.

In certain embodiments, the film coverage (total film weight) of the residue of the pretreatment coating composition is at least 10 milligrams per square meter (mg/m$^2$), such as 100 to 500 mg/m$^2$, or, in some cases at least 50 mg/m$^2$. The thickness of the pretreatment coating can vary, but it is generally very thin, often having a thickness of less than 1 micrometer, in some cases it is from 1 to 500 nanometers, and, in yet other cases, it is 10 to 300 nanometers, such as 20 to 100 nanometers.

In certain embodiments, the off-shift method is used to remove soluble iron from the pretreatment bath such that the pretreatment bath, at the completion of the off-shift method, is substantially free of iron, thereby essentially preventing the formation of insoluble rust in the operating bath of the pretreatment composition. As used herein, the term "substantially free," when used in reference to iron in the operating bath of the pretreatment composition, means that the total iron is present in an amount of less than 10 ppm. As described herein, in certain embodiments, the bath of the pretreatment composition is substantially free of phosphate ions when the bath is operating, such as in pretreatment systems in which the presence of phosphate in the pretreatment bath may adversely affect the deposition of the pretreatment composition on the substrate. In such embodiments, the off-shift method of removing iron from the pretreatment bath may be particularly useful for such pretreatment systems that are substantially free of phosphate ions as a method of essentially preventing the formation of insoluble rust in the pretreatment bath. Additionally, as described herein, in certain other embodiments, the bath of the pretreatment composition comprises phosphate ions as a method of essentially preventing the formation of insoluble rust in the pretreatment bath. In such embodiments, the off-shift method of removing iron from the pretreatment bath may be particularly useful as an additional or supplemental method of essentially preventing the formation of insoluble rust in the pretreatment bath.

As previously indicated, in certain embodiments, the pretreatment bath has an operating pH of greater than 4.0, such as between 4.2 and 5.5, preferably between 4.5 and 5.0, and most preferably 4.8. In certain embodiments, a first step of the off-shift method of removing iron from the pretreatment bath comprises reducing the pH of the pretreatment bath by at least 0.2, such as by at least 0.5 or at least 1.0, such that the pH of the pretreatment bath is reduced to between 1.0 and 3.8, and preferably between 2.5 and 3.3. In certain embodiments, the pH of the pretreatment bath is reduced by the addition of an acid to the pretreatment bath, including as non-limiting examples, a Group IVB fluro metal acid such as hexafluorozirconic acid and hexafluorotitanic acid, phosphoric acid, sulfuric acid, sulfamic acid, nitric acid, and mixtures thereof.

In certain embodiments of the off-shift method of removing iron from the pretreatment bath, the first step of reducing the pH of the pretreatment bath is accomplished by adding a sufficient amount of an acid to the pretreatment bath to reduce the pH as discussed above.

In certain embodiments of the off-shift method of removing iron from the pretreatment bath, a second step comprises adding phosphate ions to the pretreatment bath. In certain embodiments, the sources of phosphate ions may be alkali metal and ammonium orthophosphates present as either the monohydrogen or dihydrogen type, including as examples monosodium phosphate, disodium phosphate, and mixtures thereof. In certain embodiments, Zircobond Additive P, a monosodium phosphate solution commercially available from PPG Industries, Inc., Euclid, Ohio, is used as the source of the phosphate ions.

In certain embodiments of the off-shift method of removing iron from the pretreatment bath, a third step comprises adding an oxidizing agent to the pretreatment bath. In such embodiments, the oxidizing agent is a peroxide compound, air, sodium nitrite, sodium bromate, and mixtures thereof. In a preferred embodiment, the peroxide compound is hydrogen peroxide.

In certain embodiments of the off-shift method of removing iron from the pretreatment bath, the source of the phosphate ions and the oxidizing agent are each added in amounts that are sufficient to result in a pretreatment bath that is substantially free of iron.

In certain embodiments of the off-shift method of removing iron from the pretreatment bath, a fourth step comprises raising the pH of the pretreatment bath by at least 0.2. In embodiments, the pH is raised to above 4.0, such as 4.2 to 5.2, 4.5 to 5.0, and 4.8. In certain embodiments, the pH is raised by adding a sufficient amount of an alkaline composition to the pretreatment bath, including as non-limiting examples caustic soda, caustic potash, and sodium hydroxide. In embodiments, the alkaline composition is Chemfil Buffer, a commercial product available from PPG Industries, Inc., Euclid, Ohio, can be used in a quantity sufficient to achieve the desired operating pH.

In certain embodiments of the off-shift method of the present invention, the phosphate ions are added to the pretreatment bath in an amount sufficient to complex with the soluble iron etched from the surface of the ferrous metal substrate being treated to form iron (III) phosphate ($FePO_4$) in the bath, which results in the bath having a whitish appearance, rather than an orange or red-brown appearance associated with the presence of rust and which results in the formation of an insoluble sludge that can be removed from the bath using conventional filtration equipment. In certain embodiments of the off-shift method of the present invention, a fifth step comprises filtering the pretreatment bath using such conventional filtration equipment to remove solid matter from the pretreatment bath, i.e., iron phosphate, iron oxides, iron hydroxides, or any other insoluble sludge that forms in the pretreatment bath. In certain embodiments, the step of filtering may immediately follow raising the pH of the pretreatment bath by at least 0.2. In certain other embodiments, the step of filtering may follow an equilibration period during which this insoluble sludge settles to the bottom of the pretreatment bath, such as 1 to 10 hours after raising the pH of the pretreatment bath.

The off-shift method of the present invention, therefore, removes soluble iron in the bath (from the ferrous metal substrate) that is available to become insoluble rust that can deposit on the substrate and be carried to subsequent processing equipment, such as a downstream spray nozzles, pumps, rinse baths, and electrocoat baths for the deposition of an organic coating. As previously indicated, such cross-contamination can detrimentally affect the performance of such subsequently deposited coatings. It has been surprisingly discovered, however, that lowering the pH of the pretreatment bath below the operating pH and then adding the aforementioned small levels of phosphate and optionally oxidant, can essentially remove iron in the bath, thereby preventing the formation of insoluble rust in the pretreatment bath, without preventing the formation of an adequate group IIIB and/or IVB metal film after the bath pH is raised to operating levels, such that the bath can be operated for several months, maybe indefinitely, without replacement. That such steps could extend bath life to such a significant degree was surprising and not anticipated.

Following contact with the pretreatment solution, the substrate may be rinsed with water and dried.

In certain embodiments of the methods of the present invention, after the substrate is contacted with the pretreatment composition, it is then contacted with a coating composition comprising a film-forming resin. Any suitable technique may be used to contact the substrate with such a coating composition, including, for example, brushing, dipping, flow coating, spraying and the like. In certain embodiments, however, as described in more detail below, such contacting comprises an electrocoating step wherein an electrodepositable composition is deposited onto the metal substrate by electrodeposition.

As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others.

In certain embodiments, the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or cross-linking reactions also may be carried out under ambient conditions. Once cured or crosslinked, a thermosetting resin will not melt upon the application of heat and is insoluble in solvents. In other embodiments, the coating composition comprises a thermoplastic film-forming resin. As used herein, the term "thermoplastic" refers to resins that comprise polymeric components that are not joined by covalent bonds and thereby can undergo liquid flow upon heating and are soluble in solvents.

As previously indicated, in certain embodiments, the substrate is contacted with a coating composition comprising a film-forming resin by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

In certain embodiments, the coating composition comprising a film-forming resin also comprises yttrium. In certain embodiments, yttrium is present in such compositions in an amount from 10 to 10,000 ppm, such as not more than 5,000 ppm, and, in some cases, not more than 1,000 ppm, of total yttrium (measured as elemental yttrium).

Both soluble and insoluble yttrium compounds may serve as the source of yttrium. Examples of yttrium sources suitable for use in lead-free electrodepositable coating compositions are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in electrodepositable compositions are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in the pigment paste, yttrium oxide is often the preferred source of yttrium.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more colorants (described below), a water-dispersible grind resin which can be the same or different from the main-film forming polymer, and, optionally, additives such as wetting or dispersing aids.

In certain embodiments, the two component electrodepositable composition is embodied in the form of an electrodeposition bath, as is well known to those skilled in the art, wherein components (1) and (2) are dispersed in an aqueous medium which comprises water and, usually, coalescing solvents. An advantage of the methods of the present invention, as indicated earlier, is that such baths can be prevented from being contaminated with rust, even in the absence of filtration equipment.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the coating composition comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

After deposition, the coating is often heated to cure the deposited composition. The heating or curing operation is often carried out at a temperature in the range of from 120 to 250° C., such as from 120 to 190° C., for a period of time ranging from 10 to 60 minutes. In certain embodiments, the thickness of the resultant film is from 10 to 50 microns.

As will be appreciated by the foregoing description, certain embodiments of the present invention are also directed to methods for preventing rust contamination of coating equipment even in the absence of filtration equipment in a process wherein a ferrous metal substrate is being coated. In certain embodiments, such methods comprise utilizing a pretreatment composition having a pH of 4 to 5.5 and comprising, or, in some cases, consisting essentially of: (a) a Group IIIB and/or IVB metal compound; (b) phosphate ions; and (c) water. In such embodiments of the methods of the present invention, the phosphate ions are maintained in a bath of the pretreatment composition in an amount: (i) sufficient to essentially prevent the formation of insoluble rust in the bath; and (ii) insufficient to prevent the deposition of a Group IIIB and/or IVB metal film having a coverage of at least 10 mg/ft$^2$ on the ferrous metal substrate. In certain other embodiments, such methods comprise an off-shift method of removing iron from a pretreatment bath comprising a Group IIIB and/or Group IVB metal that, in certain embodiments, is substantially free of phosphate ions during operation, and in certain other embodiments, comprises phosphate ions. The off-shift method comprises the steps of: (a) reducing the pH of the pretreatment bath by at least 0.2; (b) adding phosphate ions to the pretreatment bath in (a); (c) adding an oxidizing agent to the pretreatment bath in (b); and (d) raising the pH of the pretreatment bath in (c) by at least 0.2. In such off-shift methods of removing iron from the pretreatment bath, insoluble rust may be essentially removed from the pretreatment bath. In certain embodiments, the off-shift method further comprises the step of filtering the pretreatment bath using filtration equipment.

As will also be appreciated, the present invention is also directed to methods for coating a ferrous metal substrate. In certain embodiments, these methods comprise: (a) contacting the ferrous metal substrate with an aqueous pretreatment composition having a pH of 4 to 5.5 and comprising or, in some cases, consisting essentially of: (i) a Group IIIB and/or IVB metal compound; (ii) phosphate ions; and (ii) water, wherein the phosphate ions are maintained in a bath of the pretreatment composition in an amount sufficient to essentially prevent the formation of insoluble rust in the bath; and then (b) contacting the substrate with a coating composition comprising a film-forming resin to form a coated metal substrate that exhibits corrosion resistance properties. In certain other embodiments, such methods comprise: (a) removing iron from a pretreatment bath when the pretreatment bath is off-shift; and then (b) contacting the ferrous metal substrate with an aqueous pretreatment composition having a pH of 4 to 5.5 and comprising, or in some cases, consisting essentially of: (i) a Group IIIB and/or Group IVB metal; and (ii) water; wherein the pretreatment composition is, in certain embodiments, substantially free of phosphate ions; and then (c) contacting the substrate with a coating composition comprising a film-forming resin to form a coated metal substrate that exhibits corrosion resistance properties. In such methods, the step of removing iron from the pretreatment bath when the pretreatment bath is off-shift comprises, or in some cases, consists essentially of: (a) reducing the pH of the pretreatment bath by at least 0.2; (b) adding phosphate ions to the pretreatment bath in (a); (c) adding an oxidizing agent to the pretreatment bath in (b); and (d) raising the pH of the pretreatment bath in (c) by at least 0.2. As used herein, the term "corrosion resistance properties" refers to the measurement of corrosion prevention on a metal substrate utilizing the test described in ASTM B117 (Salt Spray Test). In this test, the coated substrate is scribed with a knife to expose the bare metal substrate according to ASTM D1654-92. The scribed substrate is placed into a test chamber where an aqueous salt solution is continuously misted onto the substrate. The chamber is maintained at a constant temperature. The coated substrate is exposed to the salt spray environment for a specified period of time, such as 250, 500 or 1000 hours. After exposure, the coated substrate is removed from the test chamber and evaluated for corrosion along the scribe. Corrosion is measured by "scribe creep", which is defined as the total distance the corrosion has traveled across the scribe measured in millimeters. When it is stated that a substrate "exhibits corrosion resistance properties" it means that the scribe creep exhibited by the ferrous metal substrate is no more than 3 millimeters after testing in accordance with ASTM B 117 for 500 hours in a salt spray environment in the case where the substrate is coated with a polyester powder paint commercially available from PPG Industries, Inc. as PCT79111, according to the manufacturer's instructions.

Illustrating the invention are the following examples that are not to be considered as limiting the invention to their details. All parts and percentages in the examples, as well as throughout the specification, are by weight unless otherwise indicated.

EXAMPLES

Example 1

In one experiment, five clean steel panels were placed in a water solution of a pH of about 1.8-2.4 containing fluorozirconic acid and phosphoric acid (for 90 ppm Zr and 10 ppm $PO_4^{-3}$). After building ferrous concentration to approximately 30 ppm, the panels were removed from the clear solution and divided into one gallon (3.78 liters) portions.

The first gallon was subdivided further into 700 ml portions to which (75% by wgt.) phosphoric acid was added to yield a series of baths with phosphate ions at 10, 25, 50, 75 and 100 ppm. The same series of phosphate levels was repeated with Zirconium at 125, 150 and 200 ppm.

The pH in all sample baths was adjusted 5.0. The baths containing 30 ppm of ferrous iron and various amounts of zirconium and phosphate ions were allowed to stand in a quiescent state for two days. After two days, the appearance of the individual baths was noted. The results summarized in Table 1.0 below demonstrate that, in this example, a zirconium bath containing 30 ppm of total iron will converted from a brown to a white appearance in the presence of between 25 and 50 ppm of phosphate ion. The brown appearance is indicative of the formation of an iron oxide or an iron oxyhydroxide.

The matrix of results showed that all of the 10 ppm $PO_4^{-3}$ baths developed rust colored water and mostly brown precipitate to the same degree; i.e., without regard to the Zr level. The next lightest colored ones were all the 25 ppm $PO_4^{-3}$ baths which also had lighter colored precipitates. All the 50 ppm $PO_4^{-3}$ baths were nearly color-free with crystalline like precipitates that were barely noticeable off-white. The 75 and 100 ppm $PO_4^{-3}$ baths were all color-free with white crystalline precipitate. This white precipitate was ferric phosphate, possibly with insignificant amounts of zirconium compounds.

This example shows that a phosphate to ferric weight ratio of at least 1:1, such as at least 1.2:1, such as 1 to 1.8:1, is sufficient to essentially prevent the formation of insoluble rust in a pretreatment bath comprising a group IIIB and/or IVB metal when the bath is used to treat a ferrous metal substrate.

TABLE 1.0

| Zirconium, ppm | Phosphate, ppm | Precipitate Appearance | Total Iron, ppm | pH |
|---|---|---|---|---|
| 90 | 10 | Brown | 30 | 5.0 |
| 90 | 25 | Brown | 30 | 5.0 |
| 90 | 50 | White | 30 | 5.0 |
| 90 | 75 | White | 30 | 5.0 |
| 90 | 100 | White | 30 | 5.0 |
| 125 | 10 | Brown | 30 | 5.0 |
| 125 | 25 | Brown | 30 | 5.0 |
| 125 | 50 | White | 30 | 5.0 |
| 125 | 75 | White | 30 | 5.0 |
| 125 | 100 | White | 30 | 5.0 |
| 150 | 10 | Brown | 30 | 5.0 |
| 150 | 25 | Brown | 30 | 5.0 |
| 150 | 50 | White | 30 | 5.0 |
| 150 | 75 | White | 30 | 5.0 |
| 150 | 100 | White | 30 | 5.0 |
| 200 | 10 | Brown | 30 | 5.0 |
| 200 | 25 | Brown | 30 | 5.0 |
| 200 | 50 | White | 30 | 5.0 |
| 200 | 75 | White | 30 | 5.0 |
| 200 | 100 | White | 30 | 5.0 |

Example 2

Steel panels were cleaned using a conventional alkaline-based cleaner, rinsed twice in city water, treated in baths containing zirconium in a range of 10-150 ppm and phosphate in a range of 10-100 ppm, and then subsequently rinsed in city water. The treated steel panels were painted with either P590 cationic epoxy electrodeposited coating or PCT79111 triglycidyl isocyanurate-polyester powder coating, both of which being commercially available from a PPG Industries Inc. Corrosion performance was determined by exposing the zirconium treated and painted panels to a neutral salt-spray, according to ASTM B117, for the times indicated in Table 2.0. Acceptable performance for the cationic epoxy electrodeposited coating at 1000 hours of neutral salt-spray exposure in this test was 4.0-5.0 mm of ½ width scribe loss. Acceptable performance for the TGIC-polyester powder paint at 500 hours of neutral salt-spray exposure is 2.0-3.0 mm of ½ width scribe loss. The results below demonstrate the acceptable corrosion performance can be obtained when phosphate ions are added to the zirconium treatment bath. As shown in Example 1.0, at a low concentration of phosphate ion, the treatment bath turned brown, indicating the presence of iron oxide or iron oxyhydroxide.

TABLE 2.0

| Experiment # | PO4 | Zr | pH | Fe, ppm | ½ Width Scribe Loss, mm | | Aged Bath color |
|---|---|---|---|---|---|---|---|
| | | | | | P590 1128 hrs | PCT79111 500 hrs | |
| 1 | 10 | 10 | 5.0 | 10 | 9.0 | Na | Brown |
| 2 | 10 | 150 | 5.0 | 10 | 3.7 | 1.75 | Brown |
| 3 | 55 | 80 | 5.0 | 10 | 2.9 | 2.8 | White |
| 4 | 100 | 80 | 5.0 | 10 | 4.4 | 2.7 | White |
| 5 | 100 | 150 | 5.0 | 10 | 3.1 | 2.35 | White |

Example 3

A pretreatment solution was prepared to which increasing amounts of hexafluorozirconic acid were added. Prior to coating cold rolled steel panels, the bath pH was adjusted to 4.7. Panels from ACT Labs (Hillsdale, Mich.) were first spray cleaned in an alkaline cleaner (PPG Industries Chemkleen 611L, at 2% and 140-150° F.) and rinsed twice before entering the pretreatment zone. The zirconium bath was sprayed onto the panels for 60 seconds at 9 psi. They were then rinsed with city water and finally with a deionized water halo prior to an infrared drying step.

Panel samples were obtained at 0, 10, 15, 20, 50, and 80 ppm zirconium bath levels. Sections of each were analyzed via XPS (X-Ray photoelectron spectroscopy) for determination of layer thickness of zirconium in the coatings. The depth of the zirconium layer was determined to be the nanometer at which the profile crossed back down to the 10% atomic percent level. The resulting table of depths was graphed vs. the zirconium bath concentration as illustrated in FIG. 1.

Figure 2:
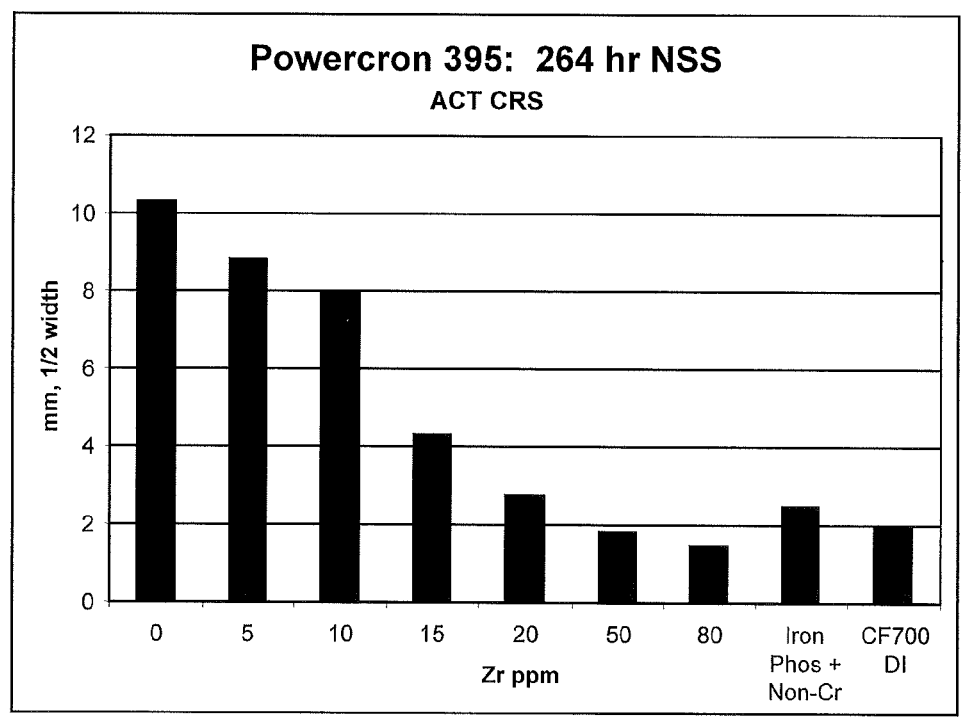

Using panels from the same series, an anionic acrylic electrocoat, commercially available from PPG Industries, Inc. as Powercron 395 was applied to three panels at each level prior to corrosion testing per ASTM B117 and D1654-92. Results are illustrated in FIG. 2. The results confirm that a good degree of corrosion protection is reached that coincides with the attainment of a minimum thickness, i.e., from a bath with 20 ppm zirconium.

Example 4

In practice, baths heavily contaminated with rust are opaque brownish red and are preceded by the appearance of translucent orange solutions, indicating the initial conversion to insoluble ferric complexes. In one experiment, ten gallons of a low pH bath (~2.7) containing 100 ppm zirconium was sprayed with steel panels for several hours until the total iron reached 50 ppm. Ferrous iron was approximately 40 ppm. Though the bath contained ten ppm of soluble ferric ions, it was clear and colorless. A large sample was divided into portions to which increasing levels of phosphate were added to determine the level that would prevent the initial discoloration of the bath after raising the pH to 5. For the control sample with no phosphate, the level of ferric increased to 24 ppm just before the bath began turning color. Results of this experiment are shown in Table 3.0.

TABLE 3.0

Initial pH = 5, clear bath, ferric available ~24 ppm

| PO4 ppm | Bath pH next day | Bath color next day | Precipitate color |
|---|---|---|---|
| 0 | 3.94 | light orange | Brown-orange |
| 5 | 3.98 | light orange | Brown-orange |
| 10 | 4.04 | slightly orange | Orange |
| 15 | 4.15 | slightly orange | Orange |
| 20 | 4.24 | slightly orange | Orange |
| 25 | 4.38 | slightly orange | Light orange |
| 35 | 4.48 | slightly orange | Light orange |
| 45 | 4.54 | light yellow | Orange-white |
| 55 | 4.54 | very light yellow | White, orange tint |

With increased PO4 level, the color change took longer and was not as intense as the zero phosphate control. In addition, the pH dropped down to the levels shown in the table after overnight storage, indicating the completion of the oxidation and precipitation steps. The pH decrease was smaller as more phosphate was used. After a certain level of phosphate, the pH remained constant—indicating an excess beyond the amount needed for the ferric. Over a couple days, the precipitate quality was evident, as described in Table 3.0. Without enough phosphate in the system, the precipitate developed as a flocculent brown oxide, resulting in a substantial decrease in pH. With enough phosphate, the precipitate was white with a density that promoted removal of the iron before it could be carried downstream.

Figure 3:
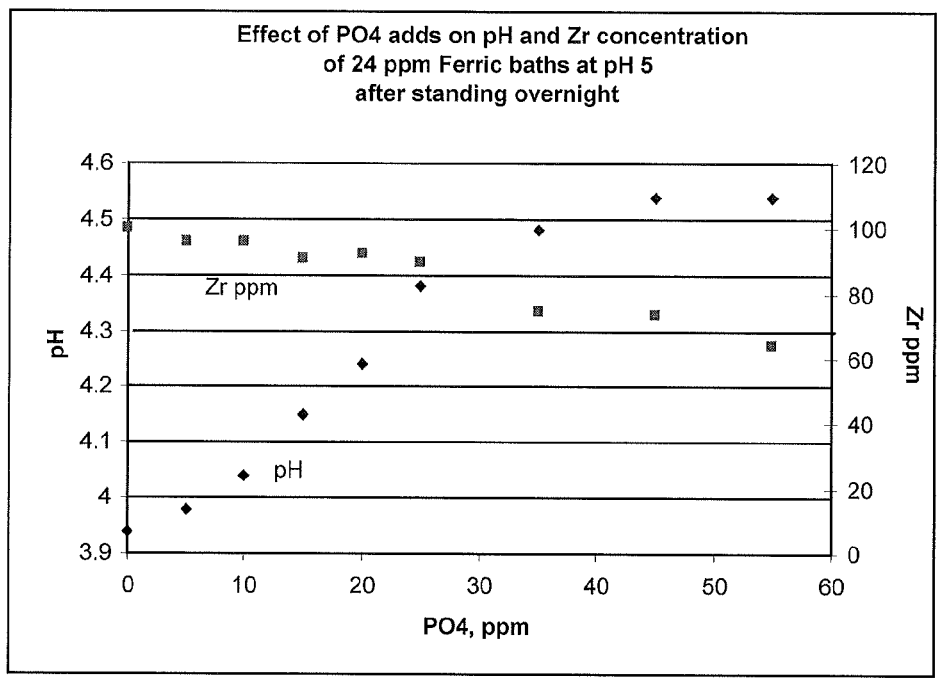
FIG. 3 is a graphical representation of observed results of Example 4.

Zirconium levels were also checked to determine the effect of any excess phosphate. FIG. 3 shows that although some zirconium was depleted from the system, the loss was not substantial. As the phosphate converts the soluble ferric complex to an insoluble ferric phosphate, the point of equivalent addition of phosphate to ferric can be seen by the plateau of the pH. This occurred at approximately 35-40 ppm of phosphate for the 24 ppm of ferric.

Thus, in working bath above, just 25-35 ppm of phosphate per 24 ppm of ferric would be enough to inhibit the development of a reddish brown bath with only minor depletion of the zirconium. Bath life for this example would be significantly longer than that typically seen in competitive industrial baths based on a group IIIB and/or IVB metal but which do not include phosphate ions. The phosphate to ferric ratio is in the range of 1:1 to 1.8:1 on a weight basis. Higher ratios could begin to deplete too much zirconium.

Example 5

Figure 4:
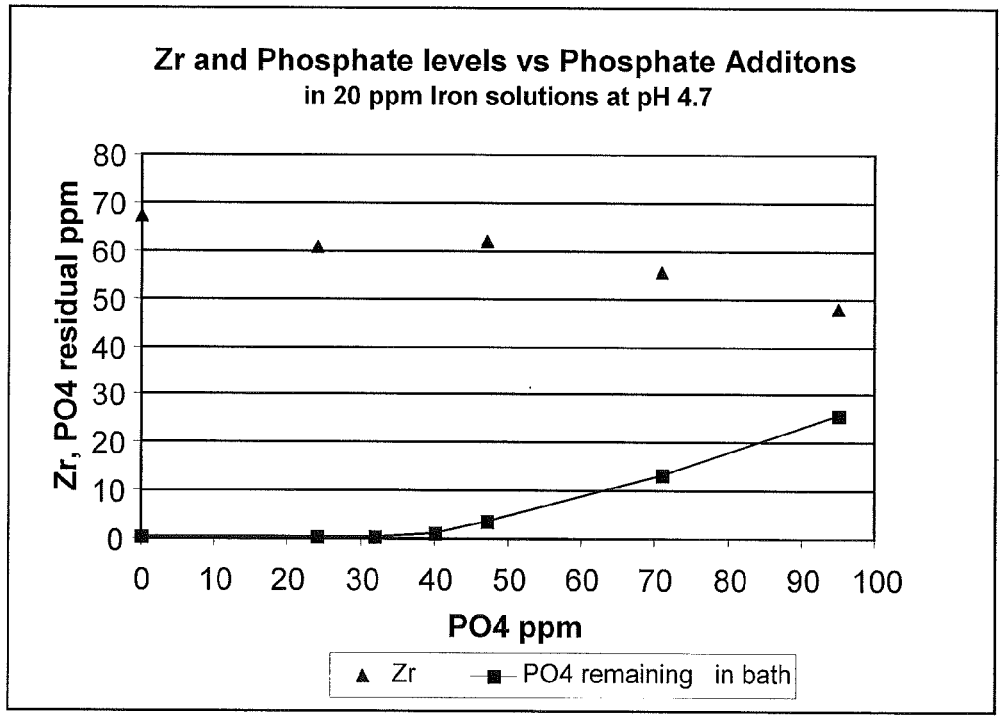
FIG. 4 is a graphical representation of observed results of Example 5.

A concentrate containing iron was obtained by hanging clean steel panels over two days into a solution of hexafluorozirconic acid in deionized water that contained no phosphate. The final ferrous level was approximately 900 ppm and ferric was 33 ppm. The concentrate was then diluted in city water to provide approximately 20 ppm ferrous and 3 ppm ferric. Varying amounts of phosphoric acid were added followed by enough hydrogen peroxide to convert all the ferrous to ferric. The pH was then adjusted to 4.7 for each bath. After standing quiescent over one day, the baths were analyzed for phosphate and zirconium. The results are plotted in FIG. 4. As is apparent, approximately 30 ppm phosphate would be enough to remove the 20 ppm ferric while maintaining most of the original 65 ppm of zirconium in solution.

Example 6

Example 6 was carried out to demonstrate that ferric iron ($Fe^{+3}$) can be removed from the pretreatment bath off-shift.

A stock solution was prepared from 3 liters of city water and 1.2 g fluorozirconic acid solution (45%). The stock solution had a target of 85 ppm Zr. To this, 0.38 ml of ferric sulfate (50% solution) was added for a target solution having 20 ppm ferric ion. The stock solution had a pH of 2.9.

The stock solution was split into Baths A-D, each containing 900 ml of the stock solution. As described in more detail below, a Hach meter was used in this Example (and in Examples 6 and 7) to measure ferrous iron ($Fe^{+2}$) and total iron concentrations at various time points. Where it was desired to obtain the concentration of ferric iron ($Fe^{+3}$) in a particular bath, ferric iron concentration was calculated as the difference between total iron concentration and ferrous iron concentration. In Example 6, none of Baths A-D contained any ferrous iron ($Fe^{+2}$) at any time point measured.

Bath A served as the control to which the ferric iron ($Fe^{+3}$) and total iron concentrations (ppm) of baths B, C and D (treated as described below) were compared.

Figure 5:
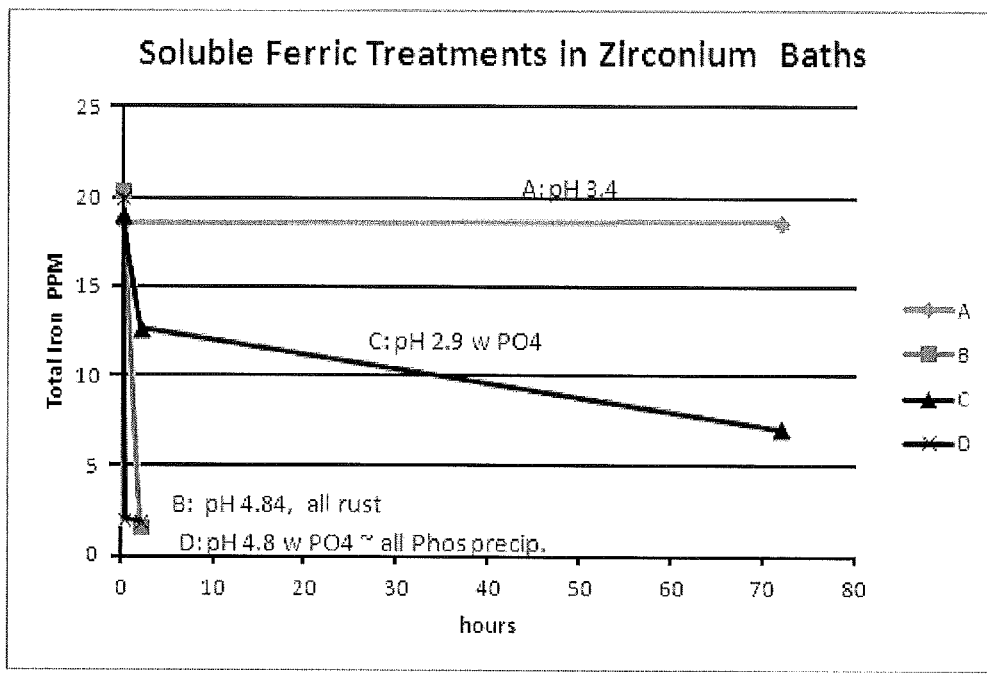
FIG. 5 is a graphical representation of observed results of Example 6.

0.1 g of Chemfil Buffer, an alkaline solution commercially available from PPG Industries, Inc., was added as a source of alkalinity to control Bath A for a resulting pH of 3.4. As illustrated in FIG. 5, the ferric iron ($Fe^{+3}$) concentration (ppm) in Bath A was about 18.6 ppm for the duration of the 72 hr experiment. There was a barely visible rust colored precipitate that formed in Bath A. These data confirm that ferric iron ($Fe^{+3}$) is fairly stable at a pH range of about 3.4.

0.5 g of Chemfil Buffer was added to the 900 ml stock solution of Bath B to raise the pH of the bath to 4.8, which was within the standard operating range for a bath containing the pretreatment composition described herein. As illustrated in FIG. 5, the ferric iron ($Fe^{+3}$) concentration in Bath B decreased from an initial concentration of about 21 ppm to a concentration of about 2 ppm by 2 hr after raising the pH of the pretreatment bath to 4.8. These data indicate that most of the soluble ferric iron was converted to rust or ferric oxide, which is insoluble in the pretreatment composition. A rusty precipitate was visible in the Bath B by 2 hr after raising the pH.

0.09 g of monosodium phosphate solution, provided as Zircobond Additive P, available from PPG Industries, Inc., Euclid, Ohio (45% by weight) was added to the 900 ml stock solution of Bath C. Bath C contained 14 ppm of phosphate and had a pH of 2.9 that was steady over the 72 hour duration of the experiment. As illustrated in FIG. 5, the ferric iron ($Fe^{+3}$) concentration in Bath C decreased from about 18 ppm to about 12 ppm in the first 2 hours of the experiment, and then continued to gradually decrease over the duration of the 72 hr experiment to a final concentration of 7 ppm. A white precipitate was visible in Bath C within the first hours of the experiment, and by the end of the experiment, a slightly tan precipitate formed, indicating that removal of ferric iron was gradual and incomplete when the pH was below the normal operating level.

0.09 g of monosodium phosphate solution, provided as Zircobond Additive P, (45% by weight) was added to the 900 ml stock solution of Bath D. Bath D contained 34 ppm of phosphate. As illustrated in FIG. 5, the ferric iron ($Fe^{+3}$) concentration of Bath D was 20 ppm. 0.5 g Chemfil Buffer was added to Bath D to raise the pH to 4.75 and the bath immediately became cloudy. After allowing the crystals to settle, a bath sample was filtered through a five micron syringe filter and this filtrate was checked for total iron. The ferric iron concentration of Bath D was 2 ppm and two hours later (at the conclusion of the experiment) was 1.9 ppm. The bath was clear with a small white precipitate.

The data from Example 6 demonstrate that the addition of phosphate to the pretreatment bath removes a large portion of the ferric iron at low pH and substantially all of the ferric in a shorter time after the pH is raised back to the operating range. These data confirm that ferric iron may be removed from the pretreatment bath when the bath is off-shift.

Example 7

The data illustrated in FIG. 5 and described in Example 6 demonstrated that ferric iron was removed from the pretreatment bath by adding phosphate to the pretreatment bath at a low pH. However, in practice, pretreatment baths that have been used to treat substrate often contain ferrous iron that has to be converted to ferric iron in order to be removed from the pretreatment bath. Example 7 and the data illustrated in Table 4 and described herein demonstrate that the addition of an oxidizing agent to the pretreatment bath improves removal of iron that was initially in the ferrous state.

A stock solution was prepared from 3 liters of city water and 1.2 g fluorozirconic acid solution (45%). The stock solution had a target of 85 ppm Zr. To this, 0.32 g of ferrous sulfate heptahydrate was added for a target solution having 20 ppm ferric ion ($Fe^{+2}$) and 23 ppm total iron. The stock solution had a pH of 3.1.

The stock solution was split into Baths E-G, each containing 900 ml of the stock solution. Bath E served as the control to which the ferrous iron ($Fe^{+2}$) and total iron concentrations (ppm) of baths F and G (treated as described below) were compared. Using a Hach meter, ferrous iron and total iron concentrations were monitored in each Bath at periodic intervals over the 44 hour duration of the experiments Bath E served as a control. Bath E had an initial pH of 3.1. A few drops of Chemfil Buffer were added to the bath to increase the pH to 3.5, which, as illustrated in Table 4, remained steady for the duration of the experiment. Also as illustrated in Table 4, the total iron concentration (ppm) in Bath E dropped from 22.8 ppm initially to 22.1 ppm at the end of the 44 hr experiment. Ferrous iron ($Fe^{+2}$) concentration was initially 19.8 ppm and dropped to 15.7 ppm at the end of the 44 hr experiment. The bath remained clear for the duration of the experiment, with no red color forming. These data indicate that all of the iron in the bath remained in solution as ferrous iron, with only a minor conversion of the ferrous iron to ferric iron. These data demonstrate that at low pH (i.e., a pH lower than operating pH) there is only minimal conversion of ferrous iron to ferric iron.

0.093 g of monosodium phosphate (45% solution) was added to Bath F to yield a solution that had 43 ppm phosphate and a ratio of $PO_4$:total iron of about 1.8:1. 0.5 g Chemfil Buffer was then added to the bath to yield a pH of 4.7. The pH of Bath F decreased slightly over the duration of the experiment, and was 4.38 at 44 hr. As illustrated in Table 4, the total iron concentration in Bath E dropped from 22.8 ppm initially to 18.5 ppm by 30 min and 14.7 ppm at the end of the 44 hr experiment. Ferrous iron concentration was initially 19.8 ppm, decreased to 17.2 ppm by 30 min, and was 12.4 ppm at the end of the 44 hr experiment. Some white precipitate, indicating the formation of ferric phosphate, formed in the bath over the duration of the experiment. These data indicate that the addition of phosphate, followed by increasing the pH to between 4.38 and 4.7, removed only some of the soluble iron as ferric phosphate because, though not intending to be limited by theory, oxidation of ferrous by increasing pH alone was relatively slow and limited by pH related equilibria.

As illustrated in Table 4, Bath G initially had a pH of 3.0, a total iron concentration of 22.8 ppm and a ferrous iron concentration of 19.8 ppm. 0.1 g of monosodium phosphate (45% solution) was added to Bath G immediately prior to adding 0.32 g hydrogen peroxide (3% wt. solution). By 15 min after adding the hydrogen peroxide, the total iron concentration was decreased to 10.2 ppm, the ferrous iron concentration was decreased to 0.4 ppm, and pH was 2.6. Some white precipitate formed in the bath, indicating that the iron-phosphate complex was partially completed. Next, the pH of the bath was increased to 4.7 by adding 0.6 g Chemfil Buffer, and 15 minutes later (i.e., 46 minutes after the start of the experiment), nearly all of the iron was removed, with the total iron concentration being 5 ppm and the ferrous iron concentration being 0.1 ppm. At the conclusion of the experiment (i.e., 44 hr after the start), the pH of the bath was 4.6, the total iron concentration was 0.24 ppm, and the ferrous iron concentration was 0.02 ppm. These data demonstrated that the addition of phosphate and hydrogen peroxide to the bath significantly improved the removal of iron from the bath at operating pH.

TABLE 4.0

| Bath | Time Elapsed (hr:min) | pH | Ferrous (Fe$^{+2}$), ppm | Total iron (ppm) | Notes |
|---|---|---|---|---|---|
| E |  | 3.1 | 19.8 | 22.8 |  |
| E | 0:00 | 3.5 | 18.3 | 23.2 | Added alkaline buffer |
| E | 44:00 | 3.54 | 15.7 | 22.1 | Clear bath |
| F |  | 3.12 | 19.8 | 22.8 | +Zircobond ADDP |
| F | 0:00 | 4.7 | 19.8 | 22.8 | Added alkaline buffer |
| F | 0:30 | 4.7 | 17.2 | 18.5 |  |
| F | 43:40 | 4.38 | 12.4 | 14.7 | White precipitate in a trace amount |
| G | 0:00 | 3.10 | 19.8 | 22.8 | Zircobond ADDP + hydrogen peroxide |
| G | 0:15 | 2.6 | 0.4 | 10.2 |  |
| G | 0:31 | 4.7 | Not measured | Not measured | Added alkaline buffer; bath turned opaque white |
| G | 0:46 | 4.7 | 0.1 | 5.0 |  |
| G | 44:00 | 4.62 | 0.02 | 0.24 | White precipitate formed |

Example 8

In this Example, an operating pretreatment bath was made by adding 3.60 g hexafluorozirconic acid to 3 liters of water to yield a solution having 240 ppm zirconium. An amount of Chemfil Buffer sufficient to raise the pH of the solution to 4.5 was added. 0.31 g of ferrous sulfate heptahydrate was added to obtain 20 ppm ferrous iron. In order to prevent the formation of rust particles, approximately 14 drops of hexafluorozirconic acid were immediately added to decrease the pH to 3.3. The bath was clear. Using a Hach meter, total iron concentration was measured to be 23.2 ppm and ferrous iron was 19.5 ppm.

Phosphate was added to the bath on an approximate 1:1 molar ratio (or 1.8:1 by weight) to the total iron that was to be precipitated. For this bath, 41.5 ppm phosphate from 0.175 g of a phosphoric acid solution (75% by wt.) was added for an excess of about 8-9 ppm. After mixing for 1 min, 1.27 g of hydrogen peroxide solution (3% by wt.) was then added based on a 1:1 molar ratio to ferrous iron (with a slight excess). The ferrous iron was converted to ferric iron in less than 1 min.

In order to precipitate all of the ferric iron as ferric phosphate, the bath pH was raised slowly to 4.75 by adding Chemfil Buffer drop-wise. If raised too quickly, some insoluble ferric oxide, as rust, could form instead of ferric phosphate. As the pH increased, a white cloudiness developed in the bath that eventually became a flocculent that completely settled within 10 minutes to yield a clear bath. This final solution contained 0.2 ppm total iron, with no detectable ferrous iron. The residual phosphate was 8.5 ppm, which was consistent with the mass balance calculation.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A method for removing iron from a pretreatment bath containing a pretreatment composition comprising a Group IIIB and/or Group IVB metal, comprising:
   (a) reducing the pH of the pretreatment bath by at least 0.2;
   (b) adding phosphate ions to the pretreatment bath in (a);
   (c) raising the pH of the pretreatment bath in (b) by at least 0.2; and
   (d) removing an insoluble sludge that forms in the pretreatment bath in (c);
   wherein the method is performed in the absence of an article to be coated by the pretreatment composition; and
   wherein the pretreatment bath is substantially free of phosphate ions during operation.

2. The method of claim 1, wherein the pH of the pretreatment bath is reduced by at least 1.0.

3. The method of claim 1, wherein the reducing comprises adding an acid to the pretreatment bath.

4. The method of claim 3, wherein the acid comprises a Group IVB fluorometal acid, phosphoric acid, sulfuric acid, sulfamic acid, nitric acid, or mixtures thereof.

5. The method of claim 3, wherein the acid comprises hexafluorozirconic acid.

6. The method of claim 1, wherein a source of the phosphate ions comprises alkali metal orthophosphates, ammonium orthophosphates, or mixtures thereof.

7. The method of claim 1, wherein a source of the phosphate ions comprises monosodium phosphate.

8. The method of claim 1, wherein the pretreatment bath in (c) is substantially free of iron.

9. The method of claim 1, further comprising adding an oxidizing agent to the pretreatment bath in (b).

10. The method of claim 9, wherein the oxidizing agent comprises peroxide compounds.

11. The method of claim 1, wherein (d) removing comprises filtering the pretreatment bath.

12. The method of claim 1, wherein the Group IIIB and/or Group IVB metal comprises zirconium.

13. The method of claim 1, wherein the insoluble sludge comprises $FePO_4$.

14. A method for removing iron from a pretreatment bath containing a pretreatment composition comprising a Group IIIB and/or Group IVB metal, comprising:
   (a) adding an acid to the pretreatment bath to reduce the pH of the pretreatment composition to below 4.0;

(b) adding phosphate ions to the pretreatment bath in (a); and
(c) raising the pH of the pretreatment bath in (b) to 4 to 5.5; and
(d) removing an insoluble sludge that forms in the pretreatment bath in (c);
  wherein the method is performed in the absence of an article to be coated by the pretreatment composition; and
  wherein the pretreatment bath is substantially free of phosphate ions during operation.

15. The method of claim 14, wherein the acid comprises hexafluorozirconic acid.

16. The method of claim 14, wherein a source of the phosphate comprises monosodium phosphate.

17. The method of claim 14, further comprising adding an oxidizing agent to the pretreatment bath in (b).

18. The method of claim 17, wherein the oxidizing agent comprises peroxide compounds.

19. The method of claim 14, wherein (d) removing comprises filtering the pretreatment bath.

20. The method of claim 14, wherein the insoluble sludge comprises $FePO_4$.

* * * * *